US011328384B2

(12) United States Patent
Shimamura et al.

(10) Patent No.: US 11,328,384 B2
(45) Date of Patent: May 10, 2022

(54) GEOMETRIC TRANSFORMATION MATRIX ESTIMATING DEVICE, GEOMETRIC TRANSFORMATION MATRIX ESTIMATING METHOD, AND PROGRAM

(71) Applicant: NIPPON TELEGRAPH AND TELEPHONE CORPORATION, Tokyo (JP)

(72) Inventors: Jun Shimamura, Tokyo (JP); Shuhei Tarashima, Tokyo (JP); Yukito Watanabe, Tokyo (JP); Takashi Hosono, Tokyo (JP); Tetsuya Kinebuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/058,089

(22) PCT Filed: May 28, 2019

(86) PCT No.: PCT/JP2019/021118
§ 371 (c)(1),
(2) Date: Nov. 23, 2020

(87) PCT Pub. No.: WO2019/230726
PCT Pub. Date: Dec. 5, 2019

(65) Prior Publication Data
US 2021/0201440 A1 Jul. 1, 2021

(30) Foreign Application Priority Data
May 28, 2018 (JP) .............................. JP2018-101340

(51) Int. Cl.
*G06T 3/00* (2006.01)
*G06T 3/60* (2006.01)
*G06T 5/00* (2006.01)

(52) U.S. Cl.
CPC .............. *G06T 3/0006* (2013.01); *G06T 3/60* (2013.01); *G06T 5/006* (2013.01)

(58) Field of Classification Search
CPC ......... G06T 3/0006; G06T 3/60; G06T 5/006; G06T 2207/20061; G06T 3/00; G06T 7/33
See application file for complete search history.

(56) References Cited

U.S. PATENT DOCUMENTS

| 10,803,350 | B2* | 10/2020 | Ma | ..................... G06K 9/00456 |
| 2009/0080699 | A1* | 3/2009 | Ng-Thow-Hing | ........ G06T 7/73 |
| | | | | 382/103 |
| 2019/0362191 | A1* | 11/2019 | Lin | ......................... G06F 16/56 |

FOREIGN PATENT DOCUMENTS

| JP | 2019012090 A | * | 1/2019 | |
| WO | WO-2019230726 A1 | * | 12/2019 | ............... G06T 3/60 |

OTHER PUBLICATIONS

Tokunaga et al. (2017) "Construction and Evaluation of a Stone Position Detection System in Curling Game," 2017 Annual Meeting of the Japan Society of Video, Information and Media, 2 pages.

(Continued)

*Primary Examiner* — Charles T Shedrick

(57) ABSTRACT

An object is to make it possible to precisely infer a geometric transformation matrix for transformation between an image and a reference image representing a plane region even if correspondence to the reference image cannot be obtained. A first line segment group extraction unit 120 extracts, out of a line segment group in an image, line segments that correspond to a direction that is parallel or perpendicular to a side of a rectangle included in the image, (Continued)

from the inside of the rectangle, takes the extracted line segments to be a first line segment group, and extracts a plurality of line segments different from the first line segment group out of the line segment group. An endpoint detection unit 150 detects four intersection points between ends of the image and two line segments that are selected from line segments that correspond to a direction that is parallel or perpendicular to a side of the rectangle and are extracted from a plurality of line segments obtained by transforming the different line segments using an affine transformation matrix in which an angle of the first line segment group relative to a reference direction of the image is used as a rotation angle. A homography matrix inferring unit 160 computes a geometric transformation matrix based on the affine transformation matrix and a homography matrix computed based on correspondence between the four intersection points and the four vertexes of the rectangle in a reference image.

20 Claims, 15 Drawing Sheets

(56) References Cited

OTHER PUBLICATIONS

Hartley et al. (2003) "Multiple View Geometry in Computer Vision: Second Edition" Cambridge University Press p. 88.

* cited by examiner

GEOMETRIC TRANSFORMATION MATRIX ESTIMATING DEVICE, GEOMETRIC TRANSFORMATION MATRIX ESTIMATING METHOD, AND PROGRAM

CROSS-REFERENCE TO RELATED APPLICATIONS

This application is a U.S. 371 Application of International Patent Application No. PCT/JP2019/021118, filed on 28 May 2019, which application claims priority to and the benefit of JP Application No. 2018-101340, filed on 28 May 2018, the disclosures of which are hereby incorporated herein by reference in their entireties.

TECHNICAL FIELD

The present invention relates to a geometric transformation matrix inference apparatus, a geometric transformation matrix inference method, and a program, and more particularly to a geometric transformation matrix inference apparatus, a geometric transformation matrix inference method, and a program for inferring a geometric transformation matrix for transformation between an input image and a reference image that includes a rectangle representing a plane region in a space.

BACKGROUND ART

There is a conventional technology (NPL 1) for inferring and outputting a geometric transformation matrix for projecting a plane that exists in a space and is captured in an image to another plane from the image. This technology enables creation of a composite image that does not have perspective projection distortion and compositing (stitching) of a plurality of images, for example.

In a method described in NPL 1, a geometric transformation matrix is inferred by specifying four corners of a rectangular field region that exists in a real space and is captured with perspective projection distortion, and associating the four corners with four corners of a reference image expressed using a field coordinate system, to realize creation of a composite image observed from directly opposite.

The above-described geometric transformation matrix is called a homography and is expressed by a 3×3 matrix. It is known that a homography can be obtained if a recognition target in an input image and a reference image have at least four corresponding points or lines (see NPL 2).

CITATION LIST

Non Patent Literature

[NPL 1] Tetsuro TOKUNAGA, Yoshihide TONOMURA, Jun SHIMAMURA, "Construction and Evaluation of a Stone Position Detection System in Curling Game", ITE annual convention, no. 14D-3, August 2017.

[NPL 2] R. Hartley and A. Zisserman, "Multiple View Geometry in Computer Vision Second Edition", Cambridge University Press, March 2004.

SUMMARY OF THE INVENTION

Technical Problem

In conventional methods, a homography, which is a geometric transformation matrix, is computed using at least four corresponding points.

However, there is a problem in that in some cases, at least four corresponding points cannot be specified between an input image and a reference image and the homography cannot be computed.

A specific example will be described using a case shown in FIG. 2 in which an input image ((B) in FIG. 2) is obtained by capturing a rectangular plane ((A) in FIG. 2) existing in a real space. Assume that a homography is to be computed to perform geometric transformation on the input image such that the input image corresponds to a reference image ((C) in FIG. 2). Also, assume that the plane in the real space is expressed using an x'-y'-z' coordinate system, and four corner points of the plane are $(x'_1, y'_1, 0)$, $(x'_2, y'_2, 0)$, $(x'_3, y'_3, 0)$, and $(x'_4, y'_4, 0)$.

If the plane is captured by bringing a camera close to the plane or is telephotographed, or is large, the input image may include not all of the four corner points $(x'_1, y'_1, 0)$, $(x'_2, y'_2, 0)$, $(x'_3, y'_3, 0)$, and $(x'_4, y'_4, 0)$ of the rectangle or not all of four sides $(x'_1, y'_1, 0)$-$(x'_2, y'_2, 0)$, $(x'_2, y'_2, 0)$-$(x'_3, y'_3, 0)$, $(x'_3, y'_3, 0)$-$(x'_4, y'_4, 0)$, and $(x'_4, y'_4, 0)$-$(x'_1, y'_1, 0)$ constituting the rectangle.

This causes a problem in that a homography cannot be computed using the four corners.

Note that in the example shown in FIG. 2, it is possible to consider using a method of determining at least four points that correspond between the input image and the reference image, with respect to characteristic points on a pattern in the plane, and computing a homography using the corresponding points.

However, there is a problem in that if the reference image does not include what corresponds to the pattern included in the input image, the homography cannot be computed.

The present invention was made in view of the foregoing, and it is an object of the present invention to provide a geometric transformation matrix inference apparatus, a geometric transformation matrix inference method, and a program with which a geometric transformation matrix for transformation between an input image and a reference image that represents a plane region can be precisely inferred even if correspondence to the reference image cannot be obtained.

Means for Solving the Problem

A geometric transformation matrix inference apparatus according to the present invention is a geometric transformation matrix inference apparatus configured to infer a geometric transformation matrix that expresses geometric transformation between a reference image that includes a rectangle representing a plane region existing in a space and an input image that is obtained by capturing the plane region, the geometric transformation matrix inference apparatus including: a line segment detection unit configured to detect a plurality of line segments included in the input image and take the plurality of line segments to be a line segment group, if the input image does not include some of the vertexes of the rectangle; a first line segment group extraction unit configured to extract, out of the line segment group, a plurality of line segments that correspond to a direction that is parallel or perpendicular to a side of the rectangle included in the input image, from the inside of the rectangle, take the extracted line segments to be a first line segment group, and extract a plurality of line segments different from the first line segment group, out of the line segment group; an affine transformation matrix computation unit configured to compute an affine transformation matrix by using, as a rotation angle, an angle of the first line segment group extracted by the first line segment group extraction unit relative to a reference direction of the input image; a second line segment group extraction unit configured to extract a plurality of line segments that correspond to a direction that is parallel or perpendicular to a side of the rectangle included in the input image, out of a plurality of line segments that are obtained by transforming, using the affine transformation matrix, the plurality of line segments that are extracted by the first line segment group extraction unit and different from the first line segment group; an endpoint detection unit configured to detect four intersection points between two line segments that are selected from the plurality of line segments extracted by the second line segment group extraction unit and upper and lower ends or left and right ends of the input image; and a homography matrix inferring unit configured to compute a homography matrix based on correspondence between the four intersection points detected by the endpoint detection unit and the four vertexes of the rectangle in the reference image, and compute the geometric transformation matrix based on the homography matrix and the affine transformation matrix.

A geometric transformation matrix inference method according to the present invention is a geometric transformation matrix inference method for inferring a geometric transformation matrix that expresses geometric transformation between a reference image that includes a rectangle representing a plane region existing in a space and an input image that is obtained by capturing the plane region, the geometric transformation matrix inference method including: if the input image does not include some of the vertexes of the rectangle, detecting a plurality of line segments included in the input image and taking the plurality of line segments to be a line segment group, by a line segment detection unit; extracting, out of the line segment group, a plurality of line segments that correspond to a direction that is parallel or perpendicular to a side of the rectangle included in the input image, from the inside of the rectangle, taking the extracted line segments to be a first line segment group, and extracting a plurality of line segments different from the first line segment group, out of the line segment group, by a first line segment group extraction unit; computing, by an affine transformation matrix computation unit, an affine transformation matrix by using, as a rotation angle, an angle of the first line segment group extracted by the first line segment group extraction unit relative to a reference direction of the input image; extracting, by a second line segment group extraction unit, a plurality of line segments that correspond to a direction that is parallel or perpendicular to a side of the rectangle included in the input image, out of a plurality of line segments that are obtained by transforming, using the affine transformation matrix, the plurality of line segments that are extracted by the first line segment group extraction unit and different from the first line segment group; detecting, by an endpoint detection unit, four intersection points between two line segments that are selected from the plurality of line segments extracted by the second line segment group extraction unit and an upper end and a lower end of the input image; and computing a homography matrix based on correspondence between the four intersection points detected by the endpoint detection unit and the four vertexes of the rectangle in the reference image and computing the geometric transformation matrix based on the homography matrix and the affine transformation matrix by a homography matrix inferring unit.

According to the geometric transformation matrix inference apparatus and the geometric transformation matrix inference method according to the present invention, if the input image does not include some of the vertexes of the rectangle, the line segment detection unit detects a plurality of line segments included in the input image and takes the plurality of line segments to be a line segment group. The first line segment group extraction unit extracts, out of the line segment group, a plurality of line segments that correspond to a direction that is parallel or perpendicular to a side of the rectangle included in the input image, from the inside of the rectangle, takes the extracted line segments to be a first line segment group, and extracts a plurality of line segments different from the first line segment group, out of the line segment group. The affine transformation matrix computation unit computes an affine transformation matrix by using, as a rotation angle, an angle of the first line segment group extracted by the first line segment group extraction unit relative to a reference direction of the input image.

Then, the second line segment group extraction unit extracts a plurality of line segments that correspond to a direction that is parallel or perpendicular to a side of the rectangle included in the input image, out of a plurality of line segments that are obtained by transforming, using the affine transformation matrix, the plurality of line segments that are extracted by the first line segment group extraction unit and different from the first line segment group. The endpoint detection unit detects four intersection points between two line segments that are selected from the plurality of line segments extracted by the second line segment group extraction unit and an upper end and a lower end of the input image. The homography matrix inferring unit computes a homography matrix based on correspondence between the four intersection points detected by the endpoint detection unit and the four vertexes of the rectangle in the reference image, and computes a geometric transformation matrix based on the homography matrix and the affine transformation matrix.

As described above, even if correspondence to the reference image representing a plane region cannot be obtained, a geometric transformation matrix for transformation between the input image and the reference image can be precisely inferred by detecting a plurality of line segments included in the input image, taking the plurality of line segments to be a line segment group, extracting line segments that correspond to a direction parallel or perpendicular to a side of the rectangle included in the input image from the inside of the rectangle, detecting four intersection points between an upper end and a lower end of the input image and two line segments selected from a plurality of line segments that correspond to a direction parallel or perpendicular to a side of the rectangle included in the input image and are extracted from a plurality of line segments that are obtained by transforming a plurality of line segments different from the line segments extracted from the line segment group, using an affine transformation matrix in which an angle of the line segments extracted from the line segment group relative to a reference direction of the input image is used as a rotation angle, and computing the geometric transformation matrix based on the affine transformation matrix and a homography matrix computed based on correspondence between the four intersection points and the four vertexes of the rectangle in the reference image.

Also, the above-described affine transformation matrix computation unit of the geometric transformation matrix inference apparatus according to the present invention can compute the affine transformation matrix by using, as the rotation angle, a median value of angles of the line segments included in the first line segment group extracted by the first line segment group extraction unit relative to the reference direction of the input image.

The geometric transformation matrix inference apparatus according to the present invention can have a configuration in which the input image includes two sides of the rectangle extending in a horizontal direction, the first line segment group extraction unit extracts, out of the line segment group, a plurality of line segments corresponding to a direction parallel to the sides of the rectangle that are included in the input image and extend in the horizontal direction, from the inside of the rectangle, the second line segment group extraction unit extracts a plurality of line segments corresponding to a direction parallel to the sides of the rectangle that are included in the input image and extend in the horizontal direction, out of a plurality of line segments that are obtained by transforming, using the affine transformation matrix, the plurality of line segments that are extracted by the first line segment group extraction unit and different from the first line segment group, and the endpoint detection unit detects four intersection points between two line segments that are selected from the plurality of line segments extracted by the second line segment group extraction unit and a left end and a right end of the input image.

The geometric transformation matrix inference apparatus according to the present invention can have a configuration in which the input image includes two sides of the rectangle extending in a vertical direction, the first line segment group extraction unit extracts, out of the line segment group, a plurality of line segments corresponding to a direction parallel to the sides of the rectangle that are included in the input image and extend in the vertical direction, from the inside of the rectangle, the second line segment group extraction unit extracts a plurality of line segments corresponding to a direction parallel to the sides of the rectangle that are included in the input image and extend in the vertical direction, out of a plurality of line segments that are obtained by transforming, using the affine transformation matrix, the plurality of line segments that are extracted by the first line segment group extraction unit and different from the first line segment group, and the endpoint detection unit detects four intersection points between two line segments that are selected from the plurality of line segments extracted by the second line segment group extraction unit and an upper end and a lower end of the input image.

The geometric transformation matrix inference apparatus according to the present invention can have a configuration in which the input image includes two sides of the rectangle extending in a horizontal direction, the first line segment group extraction unit extracts, out of the line segment group, a plurality of line segments corresponding to a direction perpendicular to the sides of the rectangle that are included in the input image and extend in the horizontal direction, from the inside of the rectangle, the second line segment group extraction unit extracts a plurality of line segments corresponding to a direction parallel to the sides of the rectangle that are included in the input image and extend in the horizontal direction, out of a plurality of line segments that are obtained by transforming, using the affine transformation matrix, the plurality of line segments that are extracted by the first line segment group extraction unit and different from the first line segment group, and the endpoint detection unit detects four intersection points between two line segments that are selected from the plurality of line segments extracted by the second line segment group extraction unit and a left end and a right end of the input image.

The geometric transformation matrix inference apparatus according to the present invention can have a configuration in which the input image includes two sides of the rectangle extending in a vertical direction, the first line segment group extraction unit extracts, out of the line segment group, a plurality of line segments corresponding to a direction perpendicular to the sides of the rectangle that are included in the input image and extend in a horizontal direction, from the inside of the rectangle, the second line segment group extraction unit extracts a plurality of line segments corresponding to a direction parallel to the sides of the rectangle that are included in the input image and extend in the horizontal direction, out of a plurality of line segments that are obtained by transforming, using the affine transformation matrix, the plurality of line segments that are extracted by the first line segment group extraction unit and different from the first line segment group, and the endpoint detection unit detects four intersection points between two line segments that are selected from the plurality of line segments extracted by the second line segment group extraction unit and an upper end and a lower end of the input image.

A program according to the present invention is a program for causing to function as each unit of the above-described geometric transformation matrix inference apparatus.

Effects of the Invention

According to the geometric transformation matrix inference apparatus, the geometric transformation matrix inference method, and the program of the present invention, a geometric transformation matrix for transformation between an input image and a reference image representing a plane region can be precisely inferred even if correspondence to the reference image cannot be obtained.

DESCRIPTION OF EMBODIMENTS

Figure 1:
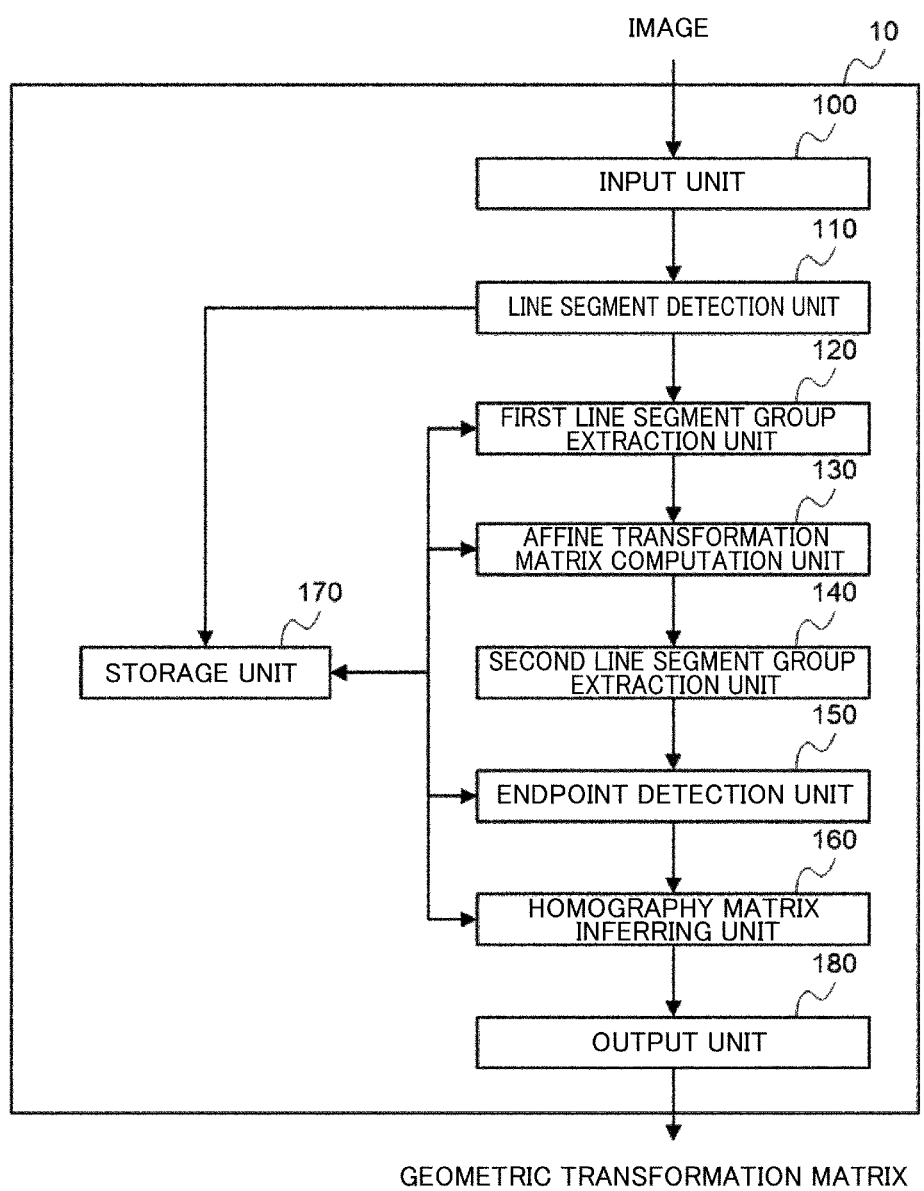
FIG. 1 is a block diagram schematically showing a configuration of a geometric transformation matrix inference apparatus.

The following describes an embodiment of the present invention using the figures.
Configuration of Geometric Transformation Matrix Inference Apparatus according to Embodiment of the Present Invention A configuration of a geometric transformation matrix inference apparatus 10 according to an embodiment of the present invention will be described with reference to FIG. 1. FIG. 1 is a block diagram showing the configuration of the geometric transformation matrix inference apparatus 10 according to an embodiment of the present invention.

Assume that the geometric transformation matrix inference apparatus 10 according to the present embodiment is aimed at computing a geometric transformation matrix (hereinafter referred to as a homography) to perform geometric transformation on an image such as that shown in FIG. 2 ((B) in FIG. 2) such that the image corresponds to a reference image ((C) in FIG. 2).

The geometric transformation matrix inference apparatus 10 is constituted by a computer that includes a CPU, a RAM, and a ROM that stores a program for executing routines of geometric transformation matrix inference processing, first line segment group extraction processing, second line segment group extraction processing, and endpoint detection processing, which will be described later, and the geometric transformation matrix inference apparatus 10 has a functional configuration described below.

As shown in FIG. 1, the geometric transformation matrix inference apparatus 10 according to the present embodiment includes an input unit 100, a line segment detection unit 110, a first line segment group extraction unit 120, an affine transformation matrix computation unit 130, a second line segment group extraction unit 140, an endpoint detection unit 150, a homography matrix inferring unit 160, a storage unit 170, and an output unit 180.

The input unit 100 accepts input of an image obtained by capturing a plane that is a rectangle (including square) existing in a space.

Figure 2:
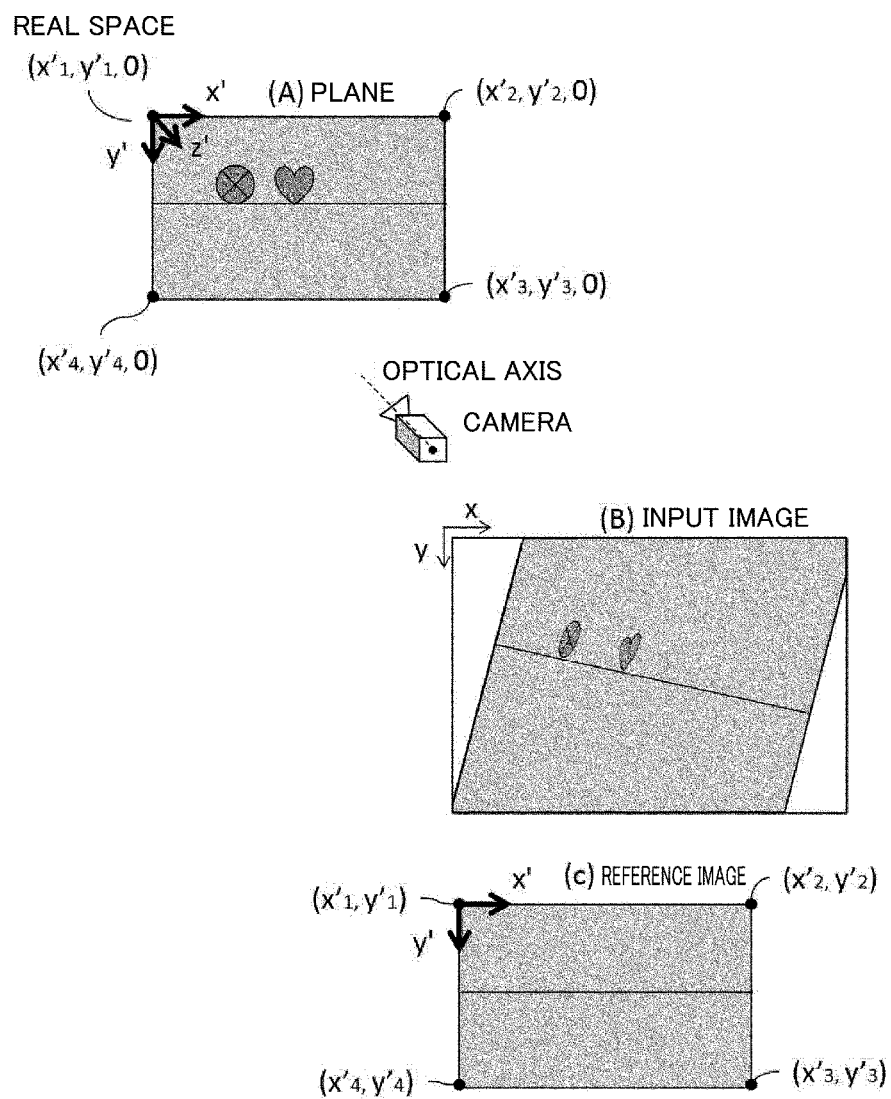
FIG. 2 is a diagram showing one example of an input image and a reference image according to an embodiment of the present invention.

Specifically, the input unit 100 accepts input of an image ((B) in FIG. 2) obtained by capturing a plane ((A) in FIG. 2) region that is a rectangle existing in a real space constituted by an x'-y'-z' coordinate system as shown in FIG. 2, using a camera having an optical axis that does not match the z' axis. Hereinafter, an image accepted by the input unit 100 will be referred to as an input image.

The input unit 100 gives the input image to the line segment detection unit 110.

If the input image does not include some of the vertexes of the rectangle, the line segment detection unit 110 detects a plurality of line segments included in the input image and takes the plurality of line segments to be a line segment group.

Specifically, the line segment detection unit 110 detects straight lines that exist in the input image and include line segments, using a straight line detector (not shown). A probabilistic Hough transformation algorithm (Reference Literature 1), LSD (Reference Literature 2), or the like can be used as the straight line detector.

[Reference Literature 1] J. Matas, C. Galambos, and J. Kittler, "Progressive Probabilistic Hough Transform," BMVC, British Machine Vision Association, 1998.

[Reference Literature 2] Rafael Grompone von Gioi, Jeremie Jakubowicz, Jean-Michel Morel, Gregory Randall, "LSD: a Line Segment Detector", Image Processing On Line, vol. 2, 2012, pp. 35-55.

As a result of the line segment detector being applied to the input image, a plurality of line segments included in the input image are detected, and both endpoint information is obtained for each of the plurality of line segments. The both endpoint information indicates a pair that is constituted by a starting point and an end point of a line segment, and if a line segment 11 is detected, the both endpoint information, which is a pair of two points, is expressed such as $(x1_{11}, y1_{11})$ and $(x2_{11}, y2_{11})$, using an x-y coordinate system of the input image. Note that if the input image includes a curve line, the straight line detector detects the curve line as a plurality of line segments.

The line segment detection unit 110 takes the plurality of line segments detected by the straight line detector to be a line segment group, and detects both endpoint information for each line segment included in the line segment group as information regarding the line segment.

The line segment detection unit 110 stores the line segment group and information regarding each line segment included in the line segment group in the storage unit 170.

Figure 3:
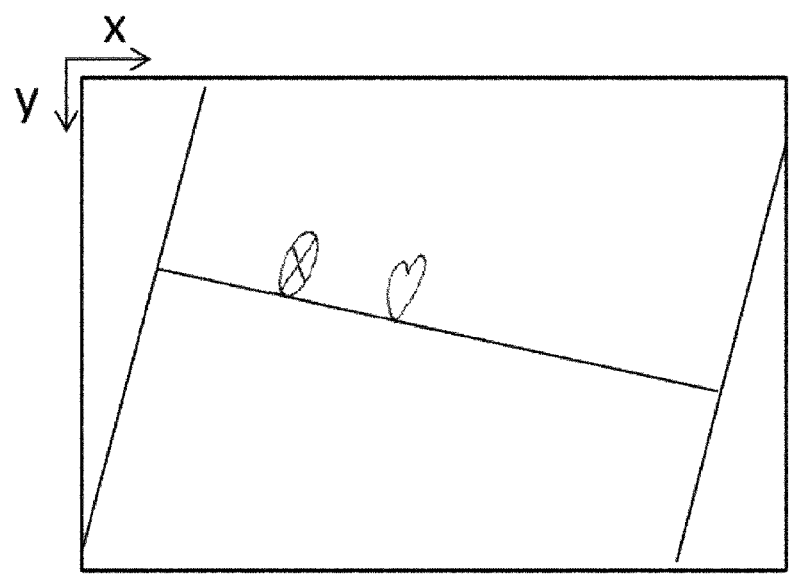
FIG. 3 is a diagram showing one example of a plurality of line segments extracted by a line segment detector according to an embodiment of the present invention.

Assume that in the present embodiment, a plurality of line segments shown in FIG. 3 are detected as a result of the line segment detector being applied to the input image, and the line segment detection unit 110 takes the plurality of line segments to be a line segment group and stores information regarding the line segments included in the line segment group in the storage unit 170.

The first line segment group extraction unit 120 extracts, out of the line segment group, a plurality of line segments that correspond to a direction that is parallel or perpendicular to a side of the rectangle that is included in the input image, from the inside of the rectangle, takes the extracted line segments to be a first line segment group, and extracts a plurality of line segments different from the first line segment group, out of the line segment group.

In the present embodiment, a case will be described as an example in which the input image includes two sides of the rectangle extending in a vertical direction, and the first line segment group extraction unit 120 extracts a plurality of line segments that correspond to a direction perpendicular to the two sides extending in the vertical direction, i.e., a plurality of line segments corresponding to horizontal lines, from the inside of the rectangle.

Specifically, the first line segment group extraction unit 120 first acquires the line segment group and information regarding line segments included in the line segment group from the storage unit 170.

Next, the first line segment group extraction unit 120 computes, with respect to each line segment included in the line segment group, a line segment length and an angle of the line segment relative to a reference direction (e.g., horizontal direction) using information regarding the line segment. For example, a line segment length L of a line segment that includes both endpoints $(x_1, y_1)$ and $(x_2, y_2)$ can be computed using the following expression (1).

[Formula 1]

$$L = \sqrt{(x_2-x_1)^2 + (y_2-y_1)^2} \qquad (1)$$

Similarly, an angle θ of the line segment can be computed using the following expression (2).

[Formula 2]

$$\theta = \tan^{-}(y_2-y_1/x_2-x_1) \qquad (2)$$

The first line segment group extraction unit 120 extracts line segments that have at least a predetermined length as "long line segments", out of the line segments included in the line segment group. This extraction processing is performed as threshold processing with respect to the line segment length L, for example. Specifically, line segments for which the line segment length L is at least a threshold value $L_{th}$ determined in advance are extracted as long line segments.

The first line segment group extraction unit 120 extracts line segments that correspond to a parallel direction, i.e., line segments that are approximate to horizontal lines, out of the line segments extracted as long line segments.

This extraction processing is performed as threshold processing with respect to the angle θ of the line segments, for example. Specifically, out of the line segments extracted as long line segments, line segments that satisfy $\theta_{H1} < \theta < \theta_{Hh}$ are selected using predetermined threshold values $\theta_{H1}$ and $\theta_{Hh}$.

Then, the first line segment group extraction unit 120 takes the selected one or more line segments to be a first line segment group, and stores each line segment included in the first line segment group in association with the angle of the line segment in the storage unit 170.

Also, the first line segment group extraction unit 120 stores each long line segment other than the first line segment group in association with the angle of the line segment in the storage unit 170.

Figure 4:
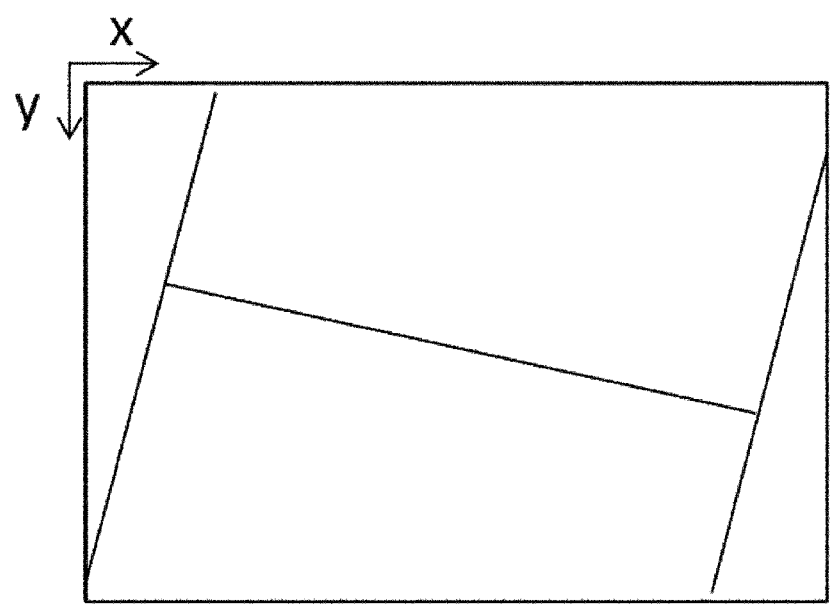
FIG. 4 is a diagram showing one example of long line segments according to an embodiment of the present invention.
Figure 5:
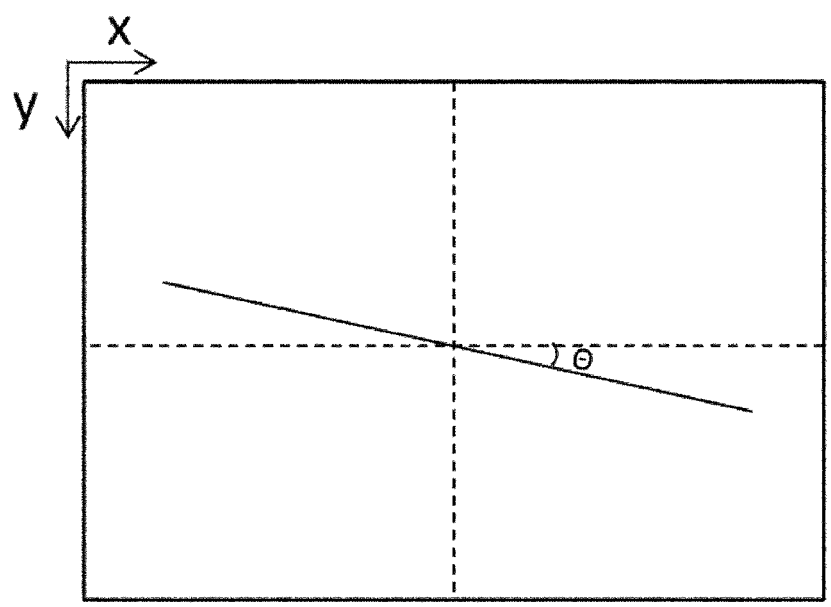
FIG. 5 is a diagram showing one example of an angle of a first line segment group according to an embodiment of the present invention relative to a reference direction of an input image.

Assume that in this example, a plurality of line segments shown in FIG. 4 are extracted as long line segments, our of which a line segment shown in FIG. 5 is extracted as the first line segment group, and this line segment is stored together with an angle θ in the storage unit 170. Also, two line segments (two longitudinal lines in FIG. 4) other than the first line segment group are stored together with angles of the line segments in the storage unit 170.

The affine transformation matrix computation unit 130 computes an affine transformation matrix using an angle of the first line segment group, which is extracted by the first line segment group extraction unit 120, relative to a reference direction of the input image as a rotation angle.

Specifically, the affine transformation matrix computation unit 130 first acquires an angle of the first line segment group from the storage unit 170 and computes a rotation angle by which the input image is to be rotated.

In the example shown in FIG. 5, the first line segment group is constituted by a single line segment, and accordingly, the rotation angle is set to −θ, using the angle θ of the line segment.

If the first line segment group extracted by the first line segment group extraction unit 120 is constituted by a plurality of line segments, the affine transformation matrix computation unit 130 computes the affine transformation matrix using, as the rotation angle, the median value of angles of the line segments constituting the first line segment group relative to the reference direction of the input image.

Figure 6:
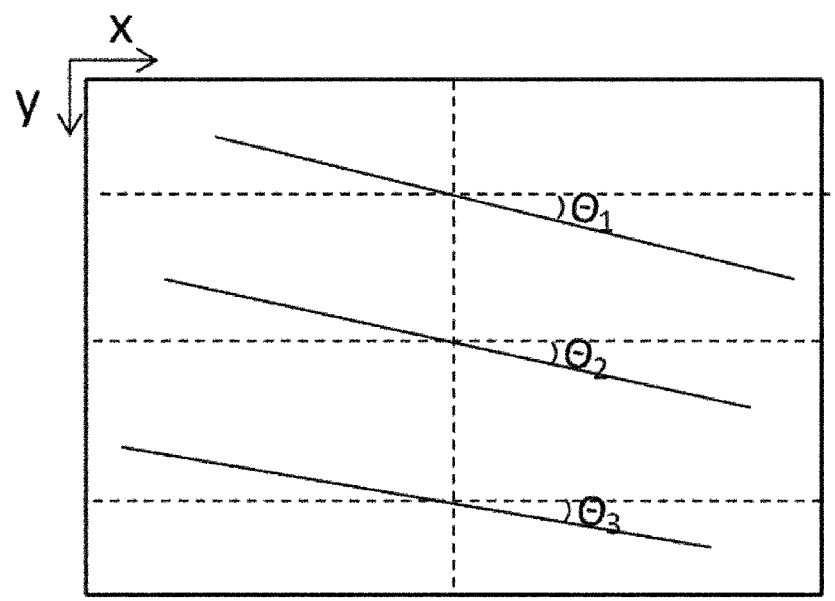
FIG. 6 is a diagram showing one example of angles relative to a reference direction of an input image in a case in which the first line segment group according to an embodiment of the present invention is constituted by a plurality of line segments.

Specifically, when the rotation angle is computed from a group of angles ($\theta_1$ to $\theta_3$) that are angles of respective line segments constituting the first line segment group as shown in FIG. 6, the affine transformation matrix computation unit 130 may compute an average $\theta_{ave}$ of all of the angles and set the rotation angle to $-\theta_{ave}$, or compute the median value $\theta_{med}$ of all of the angles and set the rotation angle to $-\theta_{med}$. Setting the rotation angle by computing the median value has an effect of increasing robustness against outliers.

Next, the affine transformation matrix computation unit 130 computes an affine transformation matrix using the computed rotation angle. The affine transformation matrix is a 2×3 matrix expressing geometric transformation that is a combination of linear transformation (enlargement, reduction, rotation, etc.,) and parallel movement of an image, and when −θ represents the rotation angle and $(C_x, C_y)$ represents coordinates of the center of the input image, an affine transformation matrix A can be computed using the following expression (3).

[Formula 3]

$$A = \begin{bmatrix} \cos(-\theta) & \sin(-\theta) & (1 - \cos(-\theta)*Cx - \sin(-\theta)*Cy) \\ -\sin(-\theta) & \cos(-\theta) & (\sin(-\theta)*Cx - (1 - \cos(-\theta))*Cy) \end{bmatrix} \qquad (3)$$

Figure 7:
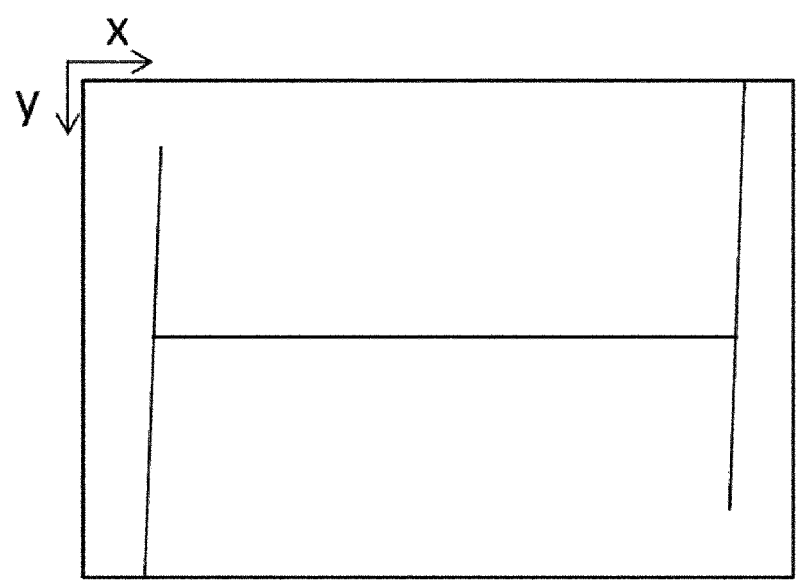
FIG. 7 is a diagram showing an example in which an input image according to an embodiment of the present invention is rotated using an affine transformation matrix.

The thus computed affine transformation matrix A expresses rotation of the image by the rotation angle −θ as shown in FIG. 7.

Then, the affine transformation matrix computation unit 130 stores the computed affine transformation matrix A in the storage unit 170.

The second line segment group extraction unit 140 extracts a plurality of line segments that correspond to a direction that is parallel or perpendicular to a side of the rectangle included in the input image, out of a plurality of line segments obtained by transforming, using the affine transformation matrix, the plurality of line segments that are extracted by the first line segment group extraction unit 120 and different from the first line segment group. In the present embodiment, a plurality of line segments corresponding to a direction parallel to the two sides of the rectangle that are included in the input image and extend in the vertical direction, i.e., a plurality of line segments corresponding to the vertical direction are extracted.

Specifically, the second line segment group extraction unit 140 first acquires information regarding long line segments other than the first line segment group and the affine transformation matrix A from the storage unit 170.

The second line segment group extraction unit 140 computes and updates endpoint information regarding all of the acquired line segments in consideration of rotation of the line segments as a result of the input image being rotated using the affine transformation matrix A.

In this update processing, updated coordinates (X, Y) of an endpoint (x, y) can be computed using the following expressions (4) and (5).

[Formula 4]

$$X = A_{11}x + A_{12}y + A_{13} \quad (4)$$

$$Y = A_{21}x + A_{22}y + A_{23} \quad (5)$$

Here, $A_{mn}$ represents an element in the m-th row and the n-th column of the affine transformation matrix A.

With respect to each of the updated line segments, the second line segment group extraction unit 140 computes an angle of the line segment relative to a reference direction of the input image by using the above-described expression (2).

The second line segment group extraction unit 140 extracts line segments that correspond to the vertical direction from all of the updated line segments.

This extraction processing is performed as threshold processing with respect to the angle θ of the line segments, for example. Specifically, line segments that satisfy $\theta_{vl} < \theta < \theta_{vh}$ are selected from all of the updated line segments, using predetermined threshold values $\theta_{vl}$ and $\theta_{vh}$.

Then, the second line segment group extraction unit 140 takes all of the selected line segments to be a second line segment group and stores the second line segment group in association with the updated endpoint coordinates and angles in the storage unit 170.

For example, the second line segment group extraction unit 140 stores, as the second line segment group, two longitudinal lines (line segments other than a horizontal line) that are shown as long line segments in FIG. 7 in the storage unit 170.

The endpoint detection unit 150 detects four intersection points between two line segments that are selected from the plurality of line segments extracted by the second line segment group extraction unit 140 and upper and lower ends or left and right ends of the input image. In the present embodiment, a case will be described as an example in which four intersection points between two line segments selected from the plurality of line segments extracted by the second line segment group extraction unit 140 and upper and lower ends of the input image are detected.

Specifically, the endpoint detection unit 150 first acquires information regarding the second line segment group from the storage unit 170 and selects two line segments from the acquired second line segment group, following a rule determined in advance.

In the present embodiment, the second line segment group stored in the storage unit 170 is constituted by only two line segments, and accordingly, these two line segments are selected.

Note that if the second line segment group is constituted by three or more line segments, the endpoint detection unit 150 follows the rule determined in advance. If the rule specifies selecting line segments that are respectively close to opposite ends in a transverse direction of the input image, the endpoint detection unit 150 first determines, with respect to each line segment, the length (hereinafter referred to as a perpendicular line length) of a perpendicular line extending from the center of the input image to the line segment.

Next, if the x coordinate of the intersection point between the perpendicular line and the line segment is larger than the x coordinate of the center of the image, the endpoint detection unit 150 adds a plus sign to the perpendicular line length, and if the x coordinate of the intersection point is smaller than the x coordinate of the center of the image, the endpoint detection unit 150 adds a minus sign to the perpendicular line length. Then, the endpoint detection unit 150 selects a line segment having the largest perpendicular line length and a line segment having the smallest perpendicular line length, whereby two line segments close to the opposite ends in the transverse direction of the image can be selected.

The endpoint detection unit 150 computes coordinates of four points at which the selected two line segments intersect with the upper end and the lower end of the input image. First, the endpoint detection unit 150 computes an equation of one of the two line segments, then computes a point of intersection with the upper end by computing a point of intersection with a straight line y=0 that expresses an upper edge of the image, and computes a point of intersection with the lower end by computing a point of intersection with a straight line y=Height that expresses a lower edge of the image. Here, Height represents the height of the input image.

By performing this processing with respect to the other line segment as well, the endpoint detection unit 150 can compute coordinates of the four intersection points at which the selected two line segments intersect with the upper end and the lower end of the image.

Figure 8:
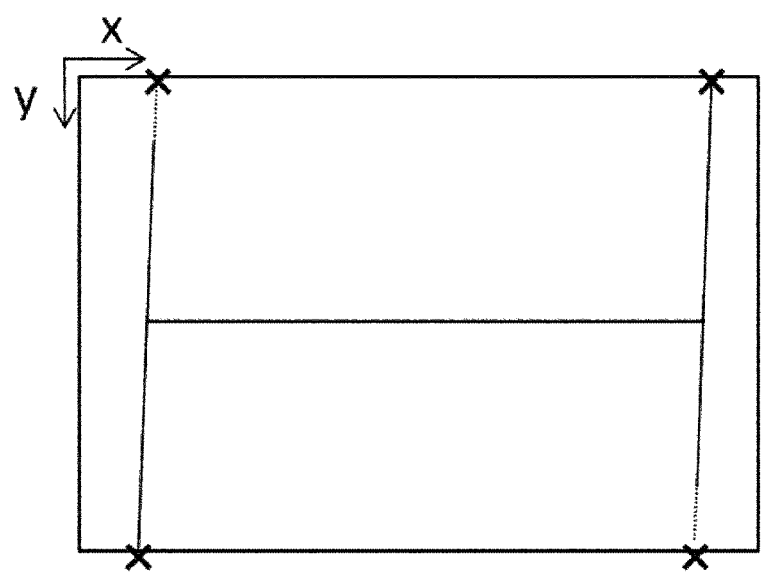
FIG. 8 is a diagram showing one example of four intersection points computed by an endpoint detection unit according to an embodiment of the present invention.

Then, the endpoint detection unit 150 stores the computed coordinates of the four intersection points in the storage unit 170. Assume that four points indicated by x in FIG. 8 are computed in the present embodiment.

The homography matrix inferring unit 160 computes a homography matrix based on correspondence between the four intersection points detected by the endpoint detection unit 150 and the four vertexes of the rectangle in the reference image, and computes a geometric transformation matrix based on the homography matrix and the affine transformation matrix.

Specifically, the homography matrix inferring unit 160 acquires coordinates of the four intersection points computed by the endpoint detection unit 150 from the storage unit 170.

Assume that the coordinates of the four intersection points are $(x_1, y_1)$, $(x_2, y_2)$, $(x_3, y_3)$, and $(x_4, y_4)$. Also, assume that coordinates of corresponding four corners of the reference image are $(x'_1, y'_1)$, $(x'_2, y'_2)$, $(x'_3, y'_3)$, and $(x'_4, y'_4)$.

Figure 9:
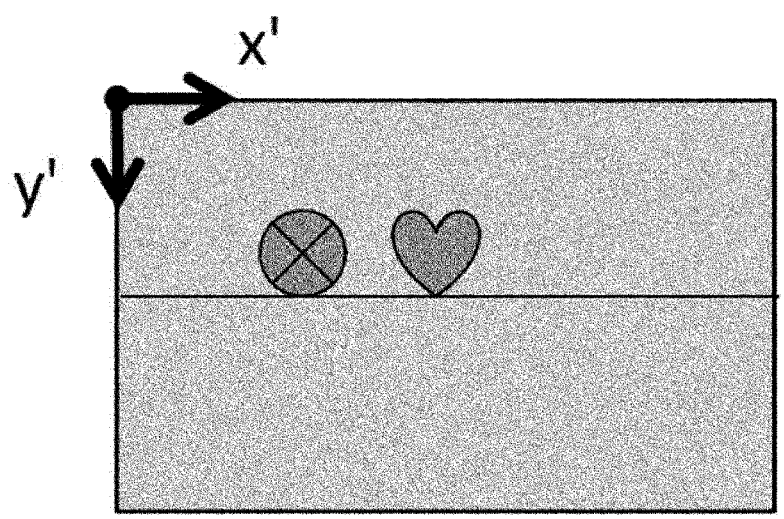
FIG. 9 is a diagram showing an example in which geometric transformation is performed using a homography matrix $H_{tmp}$ on a figure obtained by rotating an input image according to an embodiment of the present invention using an affine transformation matrix A.

The homography matrix inferring unit 160 computes a homography matrix $H_{tmp}$ based on this correspondence. The homography matrix $H_{tmp}$ can be computed using the four corresponding points and a method described in NPL 2, for example. FIG. 9 shows an example in which geometric transformation is performed using the homography matrix $H_{tmp}$ on a figure that is obtained by rotating the input image using the affine transformation matrix A.

Note that the endpoints computed by the endpoint detection unit 150 are points at which extensions of the line segments extending approximately in the vertical direction intersect with the ends of the image, and do not necessarily match the four corners constituting the rectangle existing in the space. Also, it is difficult to detect the four corners or the four sides of the rectangle that are not included in the input image. Accordingly, in the present embodiment, the homography matrix inferring unit 160 takes the points of intersection with the ends of the image computed by the endpoint detection unit 150 to be points corresponding to the four corners, and determines the homography matrix based on correspondence between these points and four corners of the reference image.

This homography matrix is not accurate in a strict sense, and therefore cannot be used for purposes such as measurement of actual dimensions, but can be used for purposes such as creation of a composite image for visualization with reduced perspective projection distortion and creation of a composite image to be input to image recognition means.

Next, the homography matrix inferring unit 160 computes a geometric transformation matrix H for geometric transformation from the input image to the reference image.

Figure 10:
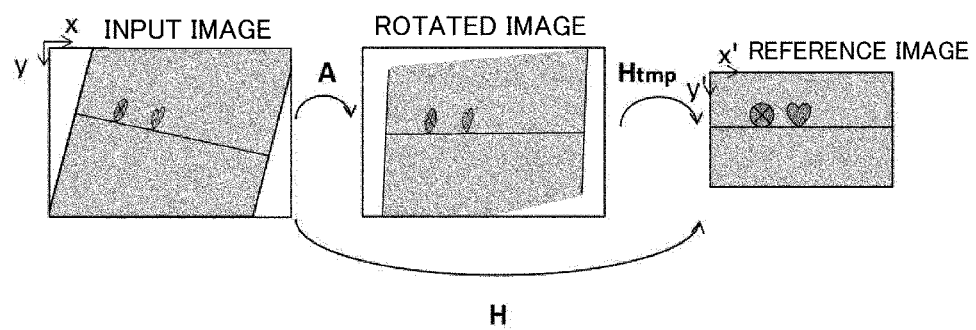
FIG. 10 is a conceptual diagram representing processing for computing a geometric transformation matrix according to an embodiment of the present invention.

Processing performed by the homography matrix inferring unit 160 to compute the geometric transformation matrix H will be described with reference to FIG. 10. The affine transformation matrix A computed by the affine transformation matrix computation unit 130 is a geometric transformation matrix for transformation from the input image to a rotated image. The homography matrix $H_{tmp}$ is a geometric transformation matrix for transformation from the rotated image to the reference image.

Accordingly, the geometric transformation matrix H for transformation from the input image to the reference image can be computed using the affine transformation matrix A, the homography matrix $H_{tmp}$, and the following expression (6).

[Formula 5]

$$H = H_{tmp} \begin{bmatrix} A_{11} & A_{12} & A_{13} \\ A_{21} & A_{22} & A_{23} \\ 0 & 0 & 1 \end{bmatrix} \quad (6)$$

The thus obtained geometric transformation matrix H is a combination of the affine transformation matrix A and the homography matrix $H_{tmp}$ and therefore differs from a homography matrix for transformation from the input image to the reference image in a strict sense, but can be considered as being approximate to the homography matrix.

In particular, even if the input image does not include four corner points or four sides constituting a rectangle existing in a space or correspondence between the input image and the reference image cannot be obtained with respect to other characteristic points, the geometric transformation matrix H for transformation between the input image and the reference image can be obtained and is effective for creation of a composite image with reduced perspective projection distortion and creation of a composite image to be input to image recognition means.

The homography matrix inferring unit 160 stores the computed geometric transformation matrix H in the storage unit 170.

The storage unit 170 stores data regarding line segment groups and the like obtained by the line segment detection unit 110, the first line segment group extraction unit 120, the affine transformation matrix computation unit 130, the second line segment group extraction unit 140, the endpoint detection unit 150, and the homography matrix inferring unit 160. Also, the storage unit 170 gives data to the first line segment group extraction unit 120, the affine transformation matrix computation unit 130, the second line segment group extraction unit 140, the endpoint detection unit 150, the homography matrix inferring unit 160, and the output unit 180, according to requests from these units.

The output unit 180 outputs the geometric transformation matrix stored in the storage unit 170.

Even if the input image does not include four corner points or four sides constituting a rectangle existing in a space or correspondence between the input image and the reference image cannot be obtained with respect to other characteristic points, the geometric transformation matrix H for transformation between the input image and the reference image can be computed, and accordingly, a composite image with reduced perspective projection distortion and a composite image to be input to image recognition means can be created, for example.

Figure 11:
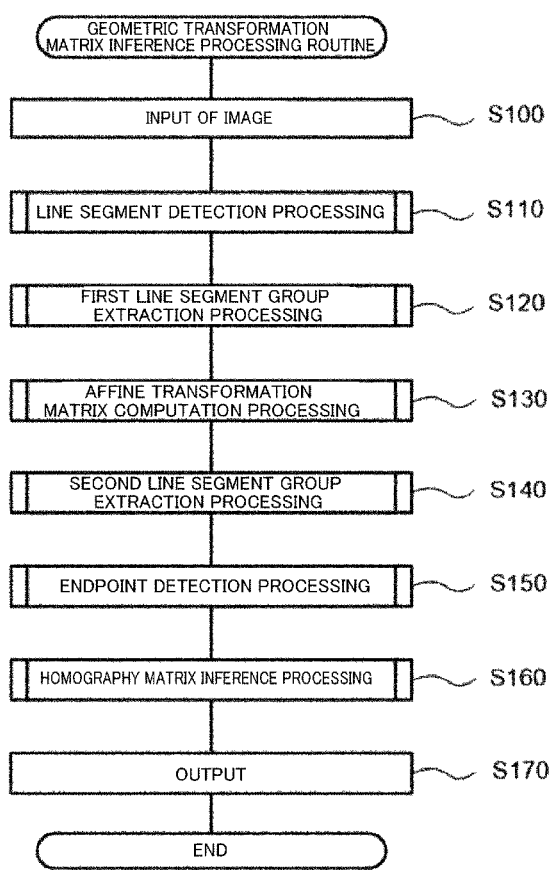
FIG. 11 is a flowchart showing a routine of geometric transformation matrix inference processing performed by a geometric transformation matrix inference apparatus according to an embodiment of the present invention.

Functions of Geometric Transformation Matrix Inference Apparatus according to Embodiment of the Present Invention FIG. 11 is a flowchart showing a routine of geometric transformation matrix inference processing according to an embodiment of the present invention.

When an image is input to the input unit 100, the routine of the geometric transformation matrix inference processing shown in FIG. 11 is executed in the geometric transformation matrix inference apparatus 10.

First, in step S100, the input unit 100 accepts input of an image (input image) obtained by capturing a plane that is a rectangle (including square) existing in a space.

In step S110, if the input image does not include some of the vertexes of the rectangle, the line segment detection unit 110 detects a plurality of line segments included in the input image and takes the plurality of line segments to be a line segment group.

In step S120, the first line segment group extraction unit 120 extracts, out of the line segment group, a plurality of line segments that correspond to a direction that is parallel or perpendicular to a side of the rectangle included in the input image, from the inside of the rectangle, takes the extracted line segments to be a first line segment group, and extracts a plurality of line segments different from the first line segment group, out of the line segment group.

In step S130, the affine transformation matrix computation unit 130 computes an affine transformation matrix using an angle of the first line segment group extracted in the above-described step S120 relative to a reference direction of the input image as a rotation angle.

In step S140, the second line segment group extraction unit 140 extracts a plurality of line segments that correspond to a direction that is parallel or perpendicular to a side of the rectangle included in the input image, out of a plurality of line segments obtained by transforming, using the affine transformation matrix, the plurality of line segments that are extracted in the above-described step S120 and different from the first line segment group.

In step S150, the endpoint detection unit 150 detects four intersection points between two line segments selected from the plurality of line segments extracted in the above-described step S140 and upper and lower ends or left and right ends of the input image.

In step S160, the homography matrix inferring unit 160 computes a homography matrix based on correspondence between the four intersection points detected by the endpoint detection unit 150 and the four vertexes of the rectangle in the reference image, and computes a geometric transformation matrix based on the homography matrix and the affine transformation matrix.

In step S170, the output unit 180 outputs the geometric transformation matrix stored in the storage unit 170.

Figure 12:
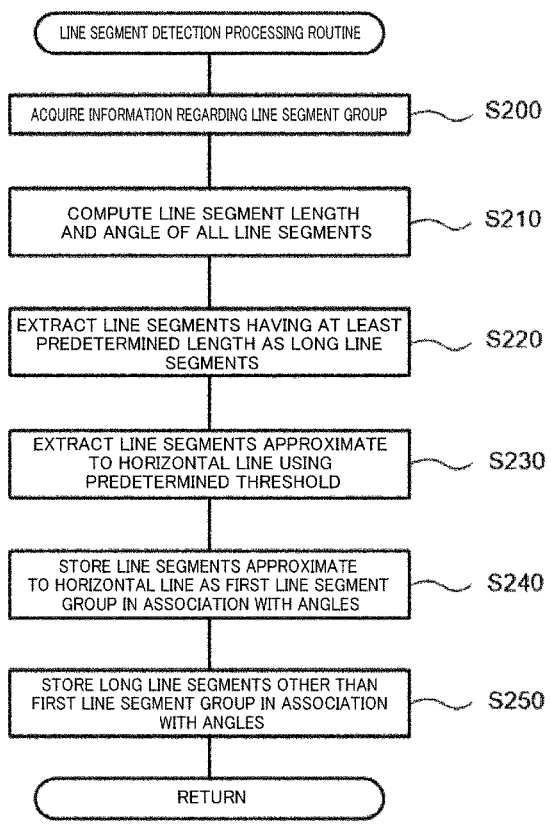
FIG. 12 is a flowchart showing a routine of line segment detection processing performed by the geometric transformation matrix inference apparatus according to an embodiment of the present invention.

Here, line segment detection processing performed in the above-described step S110 will be described. FIG. 12 is a flowchart showing a routine of the line segment detection processing. Note that a case will be described as an example in which the input image includes two sides of the rectangle extending in the vertical direction, and a plurality of line segments that correspond to a direction perpendicular to the two sides extending in the vertical direction are extracted from the inside of the rectangle.

In step S200, the first line segment group extraction unit 120 acquires the line segment group and information regarding line segments included in the line segment group from the storage unit 170.

In step S210, the first line segment group extraction unit 120 computes, with respect to each line segment included in the line segment group, a line segment length and an angle of the line segment relative to a reference direction (e.g., horizontal direction) using information regarding the line segment.

In step S220, the first line segment group extraction unit 120 extracts line segments that have at least a predetermined length as long line segments, out of the line segments included in the line segment group.

In step S230, the first line segment group extraction unit 120 extracts line segments that correspond to a direction perpendicular to the two sides extending in the vertical direction, i.e., line segments that are approximate to horizontal lines, out of the line segments extracted as long line segments.

In step S240, the first line segment group extraction unit 120 takes the extracted one or more line segments to be a first line segment group, and stores each line segment included in the first line segment group in association with the angle of the line segment in the storage unit 170.

In step S250, the first line segment group extraction unit 120 also stores each long line segment other than the first line segment group in association with the angle of the line segment in the storage unit 170.

Figure 13:
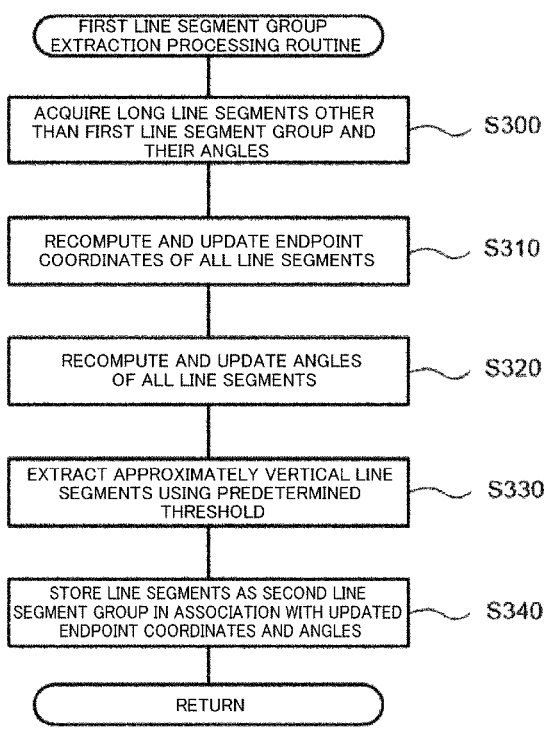
FIG. 13 is a flowchart showing a routine of second line segment group extraction processing performed by the geometric transformation matrix inference apparatus according to an embodiment of the present invention.

Second line segment group extraction processing performed in the above-described step S120 will be described. FIG. 13 is a flowchart showing a routine of the second line segment group extraction processing. Note that a case will be described as an example in which the input image includes two sides of the rectangle extending in the vertical direction and a plurality of line segments corresponding to the vertical direction are extracted.

In step S300, the second line segment group extraction unit 140 acquires information regarding long line segments other than the first line segment group and the affine transformation matrix from the storage unit 170.

In step S310, the second line segment group extraction unit 140 computes and updates endpoint information regarding all of the acquired line segments in consideration of rotation of the line segments as a result of the input image being rotated using the affine transformation matrix A.

In step S320, with respect to each of the updated line segments, the second line segment group extraction unit 140 computes an angle of the line segment relative to a reference direction of the input image.

In step S330, the second line segment group extraction unit 140 extracts line segments that correspond to the vertical direction from all of the updated line segments.

In step S340, the second line segment group extraction unit 140 takes all of the selected line segments to be a second line segment group, and stores the second line segment group in association with the updated endpoints and angles in the storage unit 170.

Figure 14:
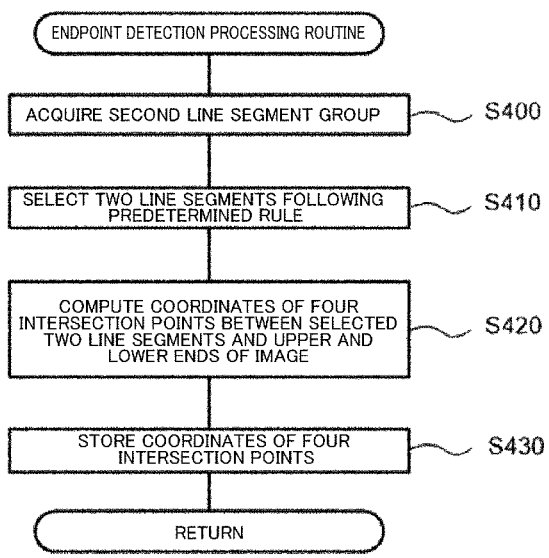
FIG. 14 is a flowchart showing a routine of endpoint detection processing performed by the geometric transformation matrix inference apparatus according to an embodiment of the present invention.

Endpoint detection processing performed in the above-described step S150 will be described. FIG. 14 is a flowchart showing a routine of the endpoint detection processing. Note that a case will be described as an example in which four intersection points between two line segments selected from the second line segment group and upper and lower ends of the input image are detected.

In step S400, the endpoint detection unit 150 acquires information regarding the second line segment group from the storage unit 170.

In step S410, the endpoint detection unit 150 selects two line segments from the second line segment group, following a rule determined in advance.

In step S420, the endpoint detection unit 150 computes coordinates of four points at which the selected two line segments intersect with the upper end and the lower end of the input image.

In step S430, the endpoint detection unit 150 stores the computed coordinates of the four intersection points in the storage unit 170.

As described above, the geometric transformation matrix inference apparatus according to the embodiment of the present invention detects a plurality of line segments included in the input image, takes the plurality of line segments to be a line segment group, and extracts line segments corresponding to a direction that is parallel or perpendicular to a side of the rectangle included in the input image, from the inside of the rectangle. Further, the geometric transformation matrix inference apparatus transforms a plurality of line segments that are different from the line segments extracted from the line segment group, using an affine transformation matrix in which an angle of the extracted line segments relative to a reference direction of the input image is used as a rotation angle. Further, the geometric transformation matrix inference apparatus detects four intersection points between left and right ends or upper and lower ends of the input image and two line segments selected from a plurality of line segments that are extracted from the transformed line segments and correspond to a direction that is parallel or perpendicular to a side of the rectangle included in the input image. Further, the geometric transformation matrix inference apparatus computes a geometric transformation matrix based on the affine transformation matrix and a homography matrix that is computed based on correspondence between the four intersection points and the four vertexes of the rectangle in the reference image. With these configurations, the geometric transformation matrix inference apparatus can precisely infer a geometric transformation matrix for transformation between an input image and a reference image representing a plane region even if correspondence to the reference image cannot be obtained.

Note that the present invention is not limited to the above-described embodiment, and the present invention can be modified and applied in various manners within a scope not departing from the gist of the present invention.

Figure 15:
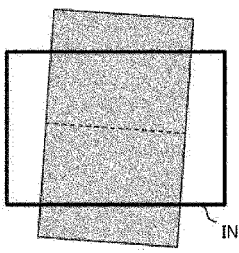
FIG. 15 is a diagram showing patterns of input images according to an embodiment of the present invention.

In the above-described embodiment, a case is described in which the input image is (B) in FIG. 2, which includes two sides of a rectangle extending in the vertical direction, the first line segment group extraction unit 120 extracts a plurality of line segments corresponding to a direction perpendicular to the two sides extending in the vertical direction, i.e., a plurality of line segments corresponding to horizontal lines, from the inside of the rectangle, the second line segment group extraction unit 140 extracts a plurality of line segments corresponding to a direction parallel to the two sides of the rectangle that are included in the input image and extend in the vertical direction, i.e., a plurality of line segments corresponding to the vertical direction, and the endpoint detection unit 150 detects four intersection points between selected two line segments and upper and lower ends of the input image (see A-a in FIG. 15). However, the present invention is not limited to this case.

For example, as is the case of B-a in FIG. 15, the input image may include two sides of the rectangle extending in the horizontal direction, and a line segment that corresponds to the vertical direction may be included in the inside of the rectangle. In this case, a geometric transformation matrix can be inferred as a result of the first line segment group extraction unit 120 extracting a plurality of line segments corresponding to a direction perpendicular to the two sides extending in the horizontal direction, i.e., a plurality of line segments corresponding to vertical lines, from the inside of the rectangle, the second line segment group extraction unit 140 extracting a plurality of line segments corresponding to a direction parallel to the sides of the rectangle extending in the horizontal direction, i.e., a plurality of line segments corresponding to the horizontal direction, and the endpoint detection unit 150 detecting four intersection points between two line segments selected from the plurality of line segments extracted by the second line segment group extraction unit 140 and left and right ends of the input image.

Also, as is the case of A-b in FIG. 15, the input image may include two sides of the rectangle extending in the vertical direction, and a line segment that corresponds to the vertical direction may be included in the inside of the rectangle. In this case, a geometric transformation matrix can be inferred as a result of the first line segment group extraction unit 120 extracting a plurality of line segments corresponding to a direction parallel to the two sides extending in the vertical direction, i.e., a plurality of line segments corresponding to vertical lines, from the inside of the rectangle, the second line segment group extraction unit 140 extracting a plurality of line segments corresponding to a direction parallel to the sides of the rectangle extending in the vertical direction, i.e., a plurality of line segments corresponding to the vertical direction, and the endpoint detection unit 150 detecting four intersection points between two line segments selected from the plurality of line segments extracted by the second line segment group extraction unit 140 and upper and lower ends of the input image.

Also, as is the case of B-b in FIG. 15, the input image may include two sides of the rectangle extending in the horizontal direction, and a line segment that corresponds to the horizontal direction may be included in the inside of the rectangle. In this case, a geometric transformation matrix can be inferred as a result of the first line segment group extraction unit 120 extracting a plurality of line segments corresponding to a direction parallel to the two sides extending in the horizontal direction, i.e., a plurality of line segments corresponding to horizontal lines, from the inside of the rectangle, the second line segment group extraction unit 140 extracting a plurality of line segments corresponding to a direction parallel to the sides of the rectangle extending in the horizontal direction, i.e., a plurality of line segments corresponding to the horizontal direction, and the endpoint detection unit 150 detecting four intersection points between two line segments selected from the plurality of line segments extracted by the second line segment group extraction unit 140 and left and right ends of the input image.

Note that to which of the above-described cases shown in FIG. 15 the input image belongs is determined in advance. Alternatively, a configuration is also possible in which the case to which the input image belongs is automatically determined through analysis of the input image. In this case, processing according to the determined case is applied.

An embodiment in which a program is installed in advance has been described in the present specification, but the program can also be provided in a state of being stored in a computer-readable recording medium.

REFERENCE SIGNS LIST

10 Geometric transformation matrix inference apparatus
100 Input unit
110 Line segment detection unit
120 First line segment group extraction unit
130 Affine transformation matrix computation unit
140 Second line segment group extraction unit
150 Endpoint detection unit
160 Homography matrix inferring unit
170 Storage unit
180 Output unit

The invention claimed is:

1. A computer-implemented method for determining aspects of a shape representing a plane region in a space, the method comprising:
receiving an input image, wherein the input image includes a shape with a side;
identifying, based on a plurality of line segments in the input image, an original set of line segments;
generating a first set of line segments from the original set of line segments, wherein the first set of line segments includes line segments that are either in parallel or perpendicular to a side of the shape in the input image;
generating a remainder portion of line segments from the original set of line segments, wherein the remainder portion of line segments and the first set of line segments are distinct;
generating, based on an angle of the first set of line segments relative to a reference direction of the input image as a rotational angle, affine transformation matrix data;
generating, based on line segments that are either in parallel or perpendicular to the side of the shape in the input image and line segments obtained by transforming the remainder portion of line segments using the affine transformation matrix, a second set of line segments;
determining, based on two line segments from the second set of line segments and upper and lower ends or left and right ends of the input image, a set of four intersection points;
generating, based on correspondence between the determined set of four intersection points and four vertices of the shape in a reference image, a homography matrix; and
determining, based on the homography matrix and the affine transformation matrix, the geometric transformation matrix.

2. The computer-implemented method of claim 1, wherein the shape is a rectangle.

3. The computer-implemented method of claim 2, the method further comprising:
determining, based on a media value of angles of the line segments in the first set of line segments relative to the reference direction of the input image as the rotational angle, the affine transformation matrix.

4. The computer-implemented method of claim 2, wherein the input image includes two sides in a horizontal direction of the shape, the method further comprising:
determining, based on a group of line segments in parallel to a side in the horizontal direction of the shape in the input image from the line segments obtained by transforming the remainder portion of line segments using the affine transformation matrix, the remainder set of line segments, wherein the reminder set of line segment and the first set of line segments are distinct; and determining, based on two line segments selected from the second set of line segments and left and right ends of the input image, the four intersection points.

5. The computer-implemented method of claim 2, wherein the input image includes two sides in a vertical direction of the shape, the method further comprising:
determining, based on a group of line segments in parallel to a side in the vertical direction of the shape in the input image from the line segments obtained by transforming the remainder portion of line segments using the affine transformation matrix, the remainder set of line segments, wherein the reminder set of line segment and the first set of line segments are distinct; and
determining, based on two line segments selected from the second set of line segments and upper and lower ends of the input image, the four intersection points.

6. The computer-implemented method of claim 2, wherein the input image includes two sides in a vertical direction of the shape, the method further comprising:
determining, based on a group of line segments in perpendicular to a side in the horizontal direction of the shape in the input image from the line segments obtained by transforming the remainder portion of line segments using the affine transformation matrix, the remainder set of line segments, wherein the reminder set of line segment and the first set of line segments are distinct; and
determining, based on two line segments selected from the second set of line segments and left and right ends of the input image, the four intersection points.

7. The computer-implemented method of claim 2, wherein the input image includes two sides in a vertical direction of the shape, the method further comprising:
determining, based on a group of line segments in perpendicular to a side in the horizontal direction of the shape in the input image from the line segments obtained by transforming the remainder portion of line segments using the affine transformation matrix, the remainder set of line segments, wherein the reminder set of line segment and the first set of line segments are distinct; and
determining, based on two line segments selected from the second set of line segments and upper and lower ends of the input image, the four intersection points.

8. A system for determining aspects of a shape representing a plane region in a space, the system comprises:
a processor; and
a memory storing computer-executable instructions that when executed by the processor cause the system to:
receive an input image, wherein the input image includes a shape with a side;
identify, based on a plurality of line segments in the input image, an original set of line segments;
generate a first set of line segments from the original set of line segments, wherein the first set of line segments includes line segments that are either in parallel or perpendicular to a side of the shape in the input image;
generate a remainder portion of line segments from the original set of line segments, wherein the remainder portion of line segments and the first set of line segments are distinct;
generate, based on an angle of the first set of line segments relative to a reference direction of the input image as a rotational angle, affine transformation matrix data;
generate, based on line segments that are either in parallel or perpendicular to the side of the shape in the input image and line segments obtained by transforming the remainder portion of line segments using the affine transformation matrix, a second set of line segments;
determine, based on two line segments from the second set of line segments and upper and lower ends or left and right ends of the input image, a set of four intersection points;
generate, based on correspondence between the determined set of four intersection points and four vertices of the shape in a reference image, a homography matrix; and
determine, based on the homography matrix and the affine transformation matrix, the geometric transformation matrix.

9. The system of claim 8, wherein the shape is a rectangle.

10. The system of claim 9, the computer-executable instructions when executed further causing the system to:
determine, based on a media value of angles of the line segments in the first set of line segments relative to the reference direction of the input image as the rotational angle, the affine transformation matrix.

11. The system of claim 9, wherein the input image includes two sides in a horizontal direction of the shape, the computer-executable instructions when executed further causing the system to:
determine, based on a group of line segments in parallel to a side in the horizontal direction of the shape in the input image from the line segments obtained by transforming the remainder portion of line segments using the affine transformation matrix, the remainder set of line segments, wherein the reminder set of line segment and the first set of line segments are distinct; and
determine, based on two line segments selected from the second set of line segments and left and right ends of the input image, the four intersection points.

12. The system of claim 9, wherein the input image includes two sides in a vertical direction of the shape, the computer-executable instructions when executed further causing the system to:
determining, based on a group of line segments in parallel to a side in the vertical direction of the shape in the input image from the line segments obtained by transforming the remainder portion of line segments using the affine transformation matrix, the remainder set of line segments, wherein the reminder set of line segment and the first set of line segments are distinct; and
determining, based on two line segments selected from the second set of line segments and upper and lower ends of the input image, the four intersection points.

13. The system of claim 9, wherein the input image includes two sides in a vertical direction of the shape, computer-executable instructions when executed further causing the system to:
determining, based on a group of line segments in perpendicular to a side in the horizontal direction of the shape in the input image from the line segments obtained by transforming the remainder portion of line segments using the affine transformation matrix, the remainder set of line segments, wherein the reminder set of line segment and the first set of line segments are distinct; and
determining, based on two line segments selected from the second set of line segments and left and right ends of the input image, the four intersection points.

14. The system of claim 9, wherein the input image includes two sides in a vertical direction of the shape, the computer-executable instructions when executed further causing the system to:
  determine, based on a group of line segments in perpendicular to a side in the horizontal direction of the shape in the input image from the line segments obtained by transforming the remainder portion of line segments using the affine transformation matrix, the remainder set of line segments, wherein the reminder set of line segment and the first set of line segments are distinct; and
  determine, based on two line segments selected from the second set of line segments and upper and lower ends of the input image, the four intersection points.

15. A computer-readable non-transitory recording medium storing computer-executable instructions that when executed by a processor cause a computer system to:
  receive an input image, wherein the input image includes a rectangle with a side;
  identify, based on a plurality of line segments in the input image, an original set of line segments;
  generate a first set of line segments from the original set of line segments, wherein the first set of line segments includes line segments that are either in parallel or perpendicular to a side of the rectangle in the input image;
  generate a remainder portion of line segments from the original set of line segments, wherein the remainder portion of line segments and the first set of line segments are distinct;
  generate, based on an angle of the first set of line segments relative to a reference direction of the input image as a rotational angle, affine transformation matrix data;
  generate, based on line segments that are either in parallel or perpendicular to the side of the rectangle in the input image and line segments obtained by transforming the remainder portion of line segments using the affine transformation matrix, a second set of line segments;
  determine, based on two line segments from the second set of line segments and upper and lower ends or left and right ends of the input image, a set of four intersection points;
  generate, based on correspondence between the determined set of four intersection points and four vertices of the rectangle in a reference image, a homography matrix; and
  determine, based on the homography matrix and the affine transformation matrix, the geometric transformation matrix.

16. The computer-readable non-transitory recording medium of claim 15, the computer-executable instructions when executed further causing the system to:
  determine, based on a media value of angles of the line segments in the first set of line segments relative to the reference direction of the input image as the rotational angle, the affine transformation matrix.

17. The computer-readable non-transitory recording medium of claim 15, wherein the input image includes two sides in a horizontal direction of the rectangle, the computer-executable instructions when executed further causing the system to:
  determine, based on a group of line segments in parallel to a side in the horizontal direction of the rectangle in the input image from the line segments obtained by transforming the remainder portion of line segments using the affine transformation matrix, the remainder set of line segments, wherein the reminder set of line segment and the first set of line segments are distinct; and
  determine, based on two line segments selected from the second set of line segments and left and right ends of the input image, the four intersection points.

18. The computer-readable non-transitory recording medium of claim 15, wherein the input image includes two sides in a vertical direction of the rectangle, the computer-executable instructions when executed further causing the system to:
  determining, based on a group of line segments in parallel to a side in the vertical direction of the rectangle in the input image from the line segments obtained by transforming the remainder portion of line segments using the affine transformation matrix, the remainder set of line segments, wherein the reminder set of line segment and the first set of line segments are distinct; and
  determining, based on two line segments selected from the second set of line segments and upper and lower ends of the input image, the four intersection points.

19. The computer-readable non-transitory recording medium of claim 15, wherein the input image includes two sides in a vertical direction of the rectangle, the computer-executable instructions when executed further causing the system to:
  determining, based on a group of line segments in perpendicular to a side in the horizontal direction of the rectangle in the input image from the line segments obtained by transforming the remainder portion of line segments using the affine transformation matrix, the remainder set of line segments, wherein the reminder set of line segment and the first set of line segments are distinct; and
  determining, based on two line segments selected from the second set of line segments and left and right ends of the input image, the four intersection points.

20. The computer-readable non-transitory recording medium of claim 15, wherein the input image includes two sides in a vertical direction of the rectangle, the computer-executable instructions when executed further causing the system to:
  determine, based on a group of line segments in perpendicular to a side in the horizontal direction of the rectangle in the input image from the line segments obtained by transforming the remainder portion of line segments using the affine transformation matrix, the remainder set of line segments, wherein the reminder set of line segment and the first set of line segments are distinct; and
  determine, based on two line segments selected from the second set of line segments and upper and lower ends of the input image, the four intersection points.

\* \* \* \* \*